United States Patent
Schwoeppe et al.

(10) Patent No.: US 7,955,702 B2
(45) Date of Patent: Jun. 7, 2011

(54) ONE COMPONENT GLASS PRIMER INCLUDING OXAZOLADINE

(75) Inventors: Dirk Schwoeppe, Freienbach (CH); Arcangelo Bighetti, Au (CH)

(73) Assignee: Dow Global Technologies LLC, Midland, MI (US)

( * ) Notice: Subject to any disclaimer, the term of this patent is extended or adjusted under 35 U.S.C. 154(b) by 721 days.

(21) Appl. No.: 12/033,420

(22) Filed: Feb. 19, 2008

(65) Prior Publication Data

US 2008/0268261 A1    Oct. 30, 2008

Related U.S. Application Data

(60) Provisional application No. 60/913,700, filed on Apr. 24, 2007.

(51) Int. Cl.
*B32B 17/06* (2006.01)
*C08G 18/32* (2006.01)
*C09J 175/04* (2006.01)

(52) U.S. Cl. .................. 428/432; 525/458; 524/500

(58) Field of Classification Search .............. 428/432; 525/458; 524/500
See application file for complete search history.

(56) References Cited

U.S. PATENT DOCUMENTS

| | | | |
|---|---|---|---|
| 3,152,162 A | 10/1964 | Fischer et al. | |
| 3,549,396 A | 12/1970 | Dietz | |
| 3,743,626 A | 7/1973 | Emmons | |
| 4,367,313 A | 1/1983 | Rizk et al. | |
| 4,374,210 A | 2/1983 | Ewen et al. | |
| 4,374,237 A | 2/1983 | Berger et al. | |
| 4,385,133 A | 5/1983 | Alberino et al. | |
| 4,394,491 A | 7/1983 | Hoffman | |
| 4,396,681 A | 8/1983 | Rizk et al. | |
| 4,496,611 A | 1/1985 | Kawakubo | |
| 4,522,975 A | 6/1985 | O'Connor et al. | |
| 4,643,794 A | 2/1987 | Saracsan | |
| 4,672,100 A | 6/1987 | Schonbachler | |
| 4,687,533 A | 8/1987 | Rizk et al. | |
| 4,697,026 A | 9/1987 | Lee | |
| 4,735,830 A | 4/1988 | Oezelli et al. | |
| 4,792,316 A | 12/1988 | Skedeleski et al. | |
| 4,835,012 A | 5/1989 | Saur | |
| 4,839,122 A | 6/1989 | Weaver | |
| 4,874,805 A | 10/1989 | Mulhaupt et al. | |
| 4,910,279 A | 3/1990 | Gillis et al. | |
| 4,963,614 A | 10/1990 | Ito et al. | |
| 5,010,202 A | 4/1991 | Greco | |
| 5,114,989 A | 5/1992 | Elwell et al. | |
| 5,128,423 A * | 7/1992 | Parrinello et al. | 525/440.02 |
| 5,167,899 A | 12/1992 | Jezic | |
| 5,391,588 A | 2/1995 | Sakamoto | |
| 5,466,727 A | 11/1995 | Hsieh | |
| 5,529,655 A | 6/1996 | Bravet | |
| 5,567,530 A | 10/1996 | Drujon et al. | |
| 5,603,798 A | 2/1997 | Bhat | |
| 5,623,044 A | 4/1997 | Chaio | |
| 5,664,041 A | 9/1997 | Szum | |
| 5,840,428 A | 11/1998 | Blizzard | |
| 5,922,809 A | 7/1999 | Bhat et al. | |
| 5,948,927 A | 9/1999 | Gunther | |
| 6,008,305 A * | 12/1999 | Wang et al. | 525/440.03 |
| 6,048,579 A | 4/2000 | Wang et al. | |
| 6,080,817 A | 6/2000 | Thieben et al. | |
| 6,133,398 A | 10/2000 | Bhat et al. | |
| 6,228,433 B1 | 5/2001 | Witt | |
| 6,395,856 B1 | 5/2002 | Petty et al. | |
| 6,438,306 B1 | 8/2002 | Bishop | |
| 6,592,998 B2 | 7/2003 | Anderson et al. | |
| 6,592,999 B1 | 7/2003 | Anderson et al. | |
| 6,623,791 B2 | 9/2003 | Sadvary et al. | |
| 6,649,016 B2 | 11/2003 | Wu et al. | |
| 6,875,470 B2 | 4/2005 | Trabesinger et al. | |
| 6,974,500 B2 | 12/2005 | Miyata et al. | |
| 7,022,748 B2 | 4/2006 | Wilke et al. | |
| 7,087,127 B2 | 8/2006 | Mahdi et al. | |
| 7,122,289 B2 | 10/2006 | Wilke et al. | |
| 2001/0041782 A1 | 11/2001 | Okuhira et al. | |
| 2002/0086914 A1 | 7/2002 | Lee et al. | |
| 2003/0084955 A1 | 5/2003 | Smith et al. | |
| 2003/0100676 A1 | 5/2003 | Okuhira et al. | |
| 2003/0105230 A1 | 6/2003 | Hellmann | |
| 2004/0106718 A1 | 6/2004 | Krohn | |
| 2004/0191521 A1 | 9/2004 | Weiss et al. | |
| 2005/0081995 A1 | 4/2005 | Beckley | |
| 2005/0113484 A1 | 5/2005 | Kamen et al. | |
| 2005/0126414 A1 | 6/2005 | Weiss et al. | |
| 2005/0126683 A1 | 6/2005 | Hsieh | |
| 2005/0154076 A1 | 7/2005 | Bach | |
| 2006/0198963 A1 | 9/2006 | Chernyshov et al. | |

(Continued)

FOREIGN PATENT DOCUMENTS

EP    0414375 A1    2/1991

(Continued)

OTHER PUBLICATIONS

Copending U.S. Appl. No. 12/035,770 (U.S. Appl. No. 60/949,369), filed Dec. 18, 2007.

(Continued)

*Primary Examiner* — Thao T. Tran
(74) *Attorney, Agent, or Firm* — Dobrusin & Thennisch PC

(57) ABSTRACT

Improved long open time one component primer compositions for bonding substrates, methods and the articles made therefrom. The primer compositions include an ingredient including an oxazolidine ring or derivative or analog thereof.

21 Claims, No Drawings

U.S. PATENT DOCUMENTS

| | | |
|---|---|---|
| 2006/0287408 A1 | 12/2006 | Baikerikar et al. |
| 2008/0268259 A1 | 10/2008 | Schmatloch |
| 2008/0269452 A1 | 10/2008 | Schwoeppe |

FOREIGN PATENT DOCUMENTS

| | | |
|---|---|---|
| EP | 414375 A | 2/1993 |
| EP | 592138 A | 4/1994 |
| EP | 666290 | 9/1995 |
| EP | 687713 | 10/1997 |
| EP | 1153090 | 12/2000 |
| EP | 1217049 A1 | 6/2002 |
| EP | 1231241 | 8/2002 |
| EP | 1382625 A | 1/2004 |
| JP | 10036481 A | 2/1998 |
| JP | 2002012635 A | 1/2002 |
| JP | 2002-309163 A | 10/2002 |
| JP | 2002-309182 A | 10/2002 |
| JP | 2003-128988 A | 5/2003 |
| JP | 2003-226731 A | 8/2003 |
| JP | 2003-336008 A | 11/2003 |
| JP | 2004168957 A | 6/2004 |
| JP | 2007063551 A | 3/2007 |
| WO | 00/00530 A1 | 1/2000 |
| WO | 00/06512 A1 | 2/2000 |
| WO | 01/47644 A1 | 7/2001 |
| WO | 01/77245 A2 | 10/2001 |
| WO | 03/011583 A1 | 2/2003 |
| WO | 03/011986 A1 | 2/2003 |
| WO | 03/011992 A2 | 2/2003 |
| WO | 2006/042305 A1 | 4/2006 |
| WO | 2008/036721 | 3/2008 |
| WO | 2008/045726 A | 4/2008 |

OTHER PUBLICATIONS

Copending U.S. Appl. No. 11/959,208 (U.S. Appl. No. 60/870,639), filed Dec. 18, 2007.

Copending U.S. Appl. No. 11/958,983 (U.S. Appl. No. 60/870,643), filed Dec. 18, 2007.

Copending U.S. Appl. No. 11/959,107 (U.S. Appl. No. 60/870,641), filed Dec. 18, 2007.

Copending U.S. Appl. No. 12/041,915 (U.S. Appl. No. 60/913,703), filed Mar. 4, 2008.

Copending U.S. Appl. No. 61/014,547, filed Dec. 18, 2007, by Baikerikar et al., "Protective Coating for Window Glass Having Enhanced Adhesion to Glass Bonding Adhesives."

Copending U.S. Appl. No. 11/472,119, filed Jun. 20, 2006 (priority to U.S. Appl. No. 60/692,318, filed Jun. 20, 2005), published as 2006-0287408.

Copending U.S. Appl. No. 12/033,447 (U.S. Appl. No. 60/913,706), filed Feb. 19, 2008.

International search report, International application No. PCT/US2008/054273, mailed Jul. 31, 2008.

Huntsman, "Jeffcat amine catalysts for the polyurethane Industry" Technical Bulletin pp. 1-4 and 2 additional charts, 2005.

Oxazolidine selection guide.

Crankley, Polyurethance Dispersion Based Pressure Sensitive Adhesives.

Dinitrol D-9000, Technial Data Sheet, High Modulus/Nonconductive Urethane Adhesive, Jan. 2006.

Voranol 230-660, Production Information, Polyether Polyol, published Aug. 2001.

Desmodur Rfe, "Polyisocyanate Crosslinking Agent" Product code R751, Jul. 2002.

Betaprime, "Urethane Primers" available at http://automotive.dow.com/after/products/UrethanePrimers.htm, last accessed Jun. 20, 2006.

Desmodur N100, Bayer Product Datasheet, published Nov. 3, 2005.

Kohler, Journal of American Chemical Society, vol. 49, p. 3181 (1927).

* cited by examiner

ONE COMPONENT GLASS PRIMER INCLUDING OXAZOLADINE

CLAIM OF PRIORITY

The present application claims the benefit of the filing date of Provisional Application No. 60/913,700 (filed Apr. 24, 2007) the contents of which are hereby incorporated by reference in their entirety.

FIELD OF THE INVENTION

This invention relates to a primer, and more particularly to a primer for bonding one or more sealants to a non-porous substrate, such as for bonding a glass panel to an automotive vehicle.

BACKGROUND OF THE INVENTION

In the field of glass bonding, there is a need for a primer that can be used under a range of conditions. One desired function of the primer is to treat the glass surface to ensure a tenacious bond between the glass and sealant (e.g., adhesive). In one application, adhesive or other sealant will be applied shortly after the primer is applied. In other applications the adhesive or other sealant is applied after a considerable period of time has elapsed. It is important in all of these applications that the primer is functional at the time when the adhesive or sealant is applied. It is common to refer to the useful functional life of the primer as its open time. This generally refers to the time between application of the primer and the time at which an adhesive or other sealant can no longer be applied to the primer and used optimally for bonding. That is, for an application involving installation of glass in an automotive vehicle, if the primer cures too rapidly and becomes intractable with which to work, then a window installer is without sufficient time to install and properly place the glass into the vehicle frame. For present glass bonding purposes (particularly for automotive applications), generally, optimum bonding use requires that the failure mode of the adhesive or other sealant to the primer be predominantly cohesive, and more specifically, substantially entirely cohesive.

Examples from the literature addressing primer materials in this field include Published U.S. Patent Application Nos. US20010041782A1, 20030100676A1; U.S. Pat. Nos. 5,010, 202; 4,874,805; 4,396,681; 4,367,313; 6,875,470; EP Patent No. 1217049A1; JP Patent Application Publication Nos. JP2003-336008, JP2003-128988, JP2002-309182, and JP2002-309163, all of which are hereby expressly incorporated by reference. Two component primers may be employed and many are known to exhibit both short open time properties and long open time properties. However, two component primers generally require additional steps of labor and handling.

U.S. Pat. No. 6,133,398, incorporated by reference, describes a one-part adhesive composition including a polyurethane prepolymer, which may employ a compound containing at least one oxazolidine moiety.

SUMMARY OF THE INVENTION

The present invention is directed generally to a one component long open time primer composition that comprises a base primer composition (preferably dispersed or dissolved in a volatile solvent) including (a) an isocyanate functional prepolymer ("prepolymer (a)") derived from the reaction of an aliphatic polyisocyanate and a polyol, and which is partially reacted with an amino group of a secondary aminosilane, wherein the aminosilane includes two or three methoxy groups bound to silicon, two or three ethoxy groups bound to silicon, or a combination thereof; (b) an isocyanate functional prepolymer ("prepolymer (b)") with an isocyanate content greater than about 1%, which is the reaction product of an aromatic polyisocyanate and a polyol of Mn>300 (e.g., a reaction product of an aromatic diisocyanate and a polyether triol); and an ingredient including an oxazolidine ring or derivative or analog thereof, wherein the primer exhibits an open time of at least about 1 week, more preferably at least about 1 month, and still more preferably at least about 3 months or longer.

The primer composition may also include one or a combination of (1) a first adduct of (i) an aliphatic isocyanate and (ii) a mercaptosilane, an amino-silane (e.g., a secondary aminosilane) or both (e.g., particularly a silane having two or three methoxy and/or ethoxy groups bound to the Si-atom); or (2) an adhesion promoter, such as one including a second adduct of (i) an aromatic polyisocyanate and (ii) a mercaptosilane, an amino-silane (e.g., a secondary aminosilane) or both (e.g., particularly a silane having two or three methoxy and/or ethoxy groups bound to the Si-atom). For example, for use in the adhesion promoter, a possible aromatic polyisocyanate includes a thiophosphate, a phosphate, a thiophosphane moiety, or any combination thereof. Specifically it may be a tris-(isocyanatophenyl) thiophosphate.

The compositions may further include a colorant or pigment (e.g., carbon black). The ingredients are dispersed and/or dissolved in a suitable solvent, and optionally may include a suitable catalyst.

The ingredient including an oxazolidine ring, or derivative or analog thereof, includes a bisoxazolidine and is present in an amount of about 2 to about 8% by weight of the overall composition. For example, it may include a carbamic acid, 1,6-hexanediyl bis-, bis(2-(2-(1-methylethyl)-3-oxazolidinyl)ethyl)ester, and is present in an amount of about 4 to about 6% by weight of the overall composition.

It is possible that the composition will employ the second adduct in an amount ranging from about 0 to about 20% by weight of the overall composition, such as from about 2 to about 10% by weight of the overall composition, or even more specifically from about 4 to about 6% by weight of the overall composition. The composition may further include one or any combination of a (meth)acrylic film former in an amount less than about 10% by weight of the overall composition; a filler; a stabilizer such as diethylmalonate; or an acid such as phosphoric acid.

The invention also contemplates methods of using the compositions herein, which include steps of applying the primer compositions to a first substrate; waiting at least about 20 seconds, 1 minute, 3 minutes or longer; applying an adhesive over the primer composition and bonding a second substrate to the adhesive. For example, one method of bonding a glass panel to a vehicle structure, may include the steps of (a) applying the primer herein substantially along the periphery of one side of a glass panel (b) superimposing on the primer composition a bead of an adhesive; and (c) installing the glass panel by contacting the adhesive with a vehicle structure defining an opening for receiving the glass panel. The steps (a) and (b) may be separated by a period of longer than 20 seconds and shorter than 3 months at room temperature; by a period of longer than 1 day at room temperature; or even by a period of longer than 1 week or even 1 month at room temperature. The invention also contemplates resulting bonded structures of or other bonded structures that include the primers herein described.

DETAILED DESCRIPTION OF THE INVENTION

Unless otherwise set forth (e.g., as a weight ratio), as used herein, all parts by weight are based on 100 parts by weight of the recited composition. In a case of the resulting composition, this means the weights are based on 100 parts by weight of the overall resulting composition. It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1.

In one aspect, the present invention is directed to a base primer composition including (a) an isocyanate functional prepolymer ("prepolymer (a)") derived from the reaction of an aliphatic polyisocyanate and a polyol, and which is at least partially reacted with an amino group of a secondary aminosilane, wherein the aminosilane includes two or three methoxy groups bound to silicon, two or three ethoxy groups bound to silicon, or a combination thereof; (b) an isocyanate functional prepolymer ("prepolymer (b)") with an isocyanate content greater than about 1%; and (c) at least one solvent for (a) and (b); and an ingredient including an oxazolidine ring or derivative or analog thereof.

In another aspect, the present invention provides an improved one component long open time primer composition that includes a base primer composition in combination with: an ingredient including an oxazolidine ring or derivative or analog thereof; a first adduct of (i) an aliphatic isocyanate and (ii) a mercaptosilane, an amino-silane (e.g., a secondary aminosilane) or both (e.g., particularly a silane having two or three methoxy and/or ethoxy groups bound to the Si-atom); and an adhesion promoter including a second adduct of (i) an aromatic isocyanate and (ii) a mercaptosilane, an aminosilane (e.g., a secondary aminosilane) or both (e.g., particularly a silane having two or three methoxy and/or ethoxy groups bound to the Si-atom). Desirably the composition further includes a colorant or pigment (e.g., carbon black) and a solvent. In one approach the above combination of materials is employed in a base primer composition that includes at least one isocyanate prepolymer that includes a silicon (e.g., it is at least partially silylated with an amine functional silane), The ingredient including an oxazolidine ring or derivative or analog thereof of the present invention may be any suitable ingredient, and desirably may one that hydrolyses on exposure to moisture to yield reactive hydroxyl and amine functionalities for reacting with isocyanates present. In one specific illustration it includes a bisoxazolidine. However, it is possible it will include an isoxazolidine. Further, derivatives or analogs of oxazolidines may be employed, such as that including an oxazolidinone moiety, oxazolidinedione moiety or a combination thereof. In a particular aspect of the present invention, a preferred azole will be based upon a bisoxazolidine, having a functionality of at least 2, and more specifically a functionality of 4. Desirably the ingredient will have a flash point greater than about 50° C., e.g., about 60 or even 75° C. or higher, and may further have an NH/OH equivalent weight of about 80 or higher. For example, it is possible that the ingredient will be an aliphatic polyamino alcohol based on a urethane bisoxazolidine. An illustrative oxazolidone-containing compound is carbamic acid, 1,6-hexanediyl bis-, bis(2-(2-(1-methylethyl)-3-oxazolidinyl)ethyl)ester. Examples of commercially available ingredients useful herein include Incozol 4 or Incozol LV, available from Industrial Copolymers Ltd., or Hardener OZ available from Bayer MaterialScience. The ingredient including an oxazolidine ring or derivative or analog thereof will generally be present in an amount ranging from about 1 to about 10% by weight of the overall composition, more particularly about 2 to about 8% by weight of the overall composition, and still more particularly about 4 to about 6% by weight of the overall composition. Optionally, the ingredient including an oxazolidine ring or derivative or analog thereof is provided as a coated or encapsulated particle or droplet, e.g., in accordance with the teachings of U.S. Pat. No. 6,133,398 (incorporated by reference).

The isocyanate functional prepolymer (b) with an isocyanate content greater than about 1% generally is the reaction product of a polyol having a functionality of greater than about 2 and a molecular weight ($M_n$) greater than about 300 and an isocyanate, and more specifically an aromatic polyisocyanate. In one specific aspect, the preferred isocyanate will be a diisocyanate, such as one having a functionality of at least 2 (e.g., a trifunctional) diisocyanate. For example, the diisocyanate may be an aromatic diisocyanate, such as one selected from TDI, MDI or a combination thereof. A specific preferred diisocyanate is includes MDI or a prepolymer thereof, such as one that includes approximately 97% 4,4'-diphenyl-methane diisocyanate and 3% 2,4'-diphenyl-methane diisocyanate. A commercially available example of one such isocyanate is Isonate® M125 MDI, available through The Dow Chemical Company. Though other polyols may be selected, a particular preferred one will be a triol, and particularly one having a hydroxyl number of at least about 200. An example of one such polyol is available from the Dow Chemical Company, under the designation VORANOL™ CP260.

The first adduct will typically be a reaction product of (i) an aliphatic isocyanate and (ii) a mercaptosilane, an amino-silane (e.g., a secondary aminosilane) or both (e.g., particularly a silane having two or three methoxy and/or ethoxy groups bound to the Si-atom). A specific preferred diisocyanate is an aliphatic isocyanate, and particularly a trifunctional aliphatic polyisocyanate, such as based upon a hexamethylene diisocyanate (HDI)(an example of which is available commercially under the trade designation Desmodur® N100 from Bayer MaterialScience). Though other mercaptosilanes may be selected, a particular preferred one will be a mercaptopropyl trimethoxysilane (e.g., such as one commercially available as Dynasilan™ MTMO from Degussa or as Silquest™ A-189 from General Electric). The molecular weight of the mercaptosilane desirably is less than about 2000, more specifically is less than about 900, and still more specifically, is less than about 500 (e.g. about 200, or even about 80). The third prepolymer, if present, will generally be present in an amount ranging from about 0 to about 20% by weight of the overall composition, more particularly about 1 to about 10% by weight of the overall composition, and still more particularly about 2 to about 4% by weight of the overall composition.

The second adduct typically functions as an adhesion promoter, which generally is a reaction product of an organofunctional silane and an isocyanate. More specifically, as will be addressed, the adhesion promoter makes use of an adhesion promoter that includes at least one aromatic poly-isocyanate, which more particularly includes phosphorus.

In one embodiment, one ingredient of the second adduct may include an amino-silane, and more particularly a secondary amino-silane. One attractive silane includes at least two silyl groups, with three methoxy groups bond to each of the silanesa hindered secondary amino group or any combination thereof. An example of one such commercially available amino-silane is bis-(trimethoxysilylpropyl)-amine, such as Silquest A-1170, from GE Advanced Materials-Silicones. Additional information about suitable silane materials for use herein is found in U.S. Pat. No. 4,374,237, hereby incorporated by reference. Other examples of silanes include, without limitation, (alone or in combination with bis-(trimethoxysilylpropyl)-amine, include silanes having a hydroxy functionality, a mercapto functionality, or both, such as 3-aminopropyltrimethoxysilane, 3-aminopropyltriethoxysilane, 3-aminopropyltrismethoxy-ethoxyethoxysilane, 3-aminopropyl-methyl-diethoxysilane, N-methyl-3-aminopropyltrimethoxysi lane, N-butyl-3-aminopropyltrimethoxysilane, 3-mercaptopropyltrimethoxysilane, 3-mercaptopropyltriethoxysilane, 3-mercaptopropyl-methyl-dimethoxysilane, (N-cyclohexylaminomethy)methyldi-ethoxysilane, (N-cyclohexylaminomethyl)triethoxysilane, (N-phenylaminomethyl)methyldimethoxysilane, (N-phenylaminomethyl)trimethoxysilane, N-ethyl-aminoisobutyltrimethoxysilane, 4-amino-3,3-dimethylbutyltrimethoxysilane, or any combination thereof.

The second adduct also includes as one of its ingredients an aromatic isocyanate, and particularly a trifunctional isocyanate. In a particular preferred embodiment it includes at least one isocyanate including phosphorus. An example of one such isocyanate is described generally in U.S. Pat. No. 6,974,500; incorporated by reference, and is represented by the following Formula 1:

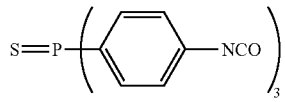

Formula 1

One possible isocyanate is tris(p-isocyanato)thiophosphane. A particularly preferred isocyanate is a thiophosphate with a isocyanate group such as a solution of tris(p-isocyanato-phenyl)-thiophosphate in ethyl acetate sold under the tradename DESMODUR RFE and commercially available from Bayer Corporation, Pittsburgh, Pa. Other examples of possible isocyanates (which may be employed alone or in combination with tris(p-isocyanato-phenyl)-thiophosphate include trifunctional isocyanates, which may be aromatic or aliphatic (e.g., an aliphatic polyisocyanate based upon HDI, and possibly having an isocyanate content of about 15 to about 25 percent). Examples of suitable trifunctional isocyanates include those commercially available under the designations Desmodur N 100, Desmodur N 3300, or Tolonate HDT.

In general, the second adduct is prepared by admixing silane with the isocyanate, particularly in an amount of about 1 mole isocyanate with about 1 to about 3 moles silane (e.g., amino-silane, mercapto silane, or combination thereof), and more specifically about one mole isocyanate with about 2.3 moles silane (e.g., amino-silane, mercapto silane, or combination thereof).

One particular approach to making the second adduct is to at least partially react an aromatic polyisocyanate having a functionality greater than about 2 with a silane (e.g., aminosilane (such as a secondary amino functional silane), mercapto silane, or combination thereof) wherein the silane includes a plurality of alkoxy groups bound to silicon (e.g., two or three methoxy groups bound to silicon, two or three ethoxy groups bound to silicon, a combination thereof or the like).

In general, the compositions herein are predicated upon the combination of the ingredients with a base primer that includes at least a first prepolymer (a) derived from the reaction of at least one polyisocyanate and at least one polyol, and particularly one that will have a free isocyanate content. In a more particular aspect, the base primer includes an isocyanate functional prepolymer derived from the reaction of an aliphatic polyisocyanate and a polyol. In one highly specific embodiment, the base primer includes an isocyanate functional prepolymer derived from the reaction of an aliphatic polyisocyanate and a polyol, and is at least partially reacted with an amino group of a silane, and particularly an aminosilane (e.g., a secondary aminosilane), wherein the aminosilane includes a plurality of alkoxy groups bound to silicon (e.g., two or three methoxy groups bound to silicon, two or three ethoxy groups bound to silicon, a combination thereof or the like); and a second prepolymer (b), described herein, and preferably with at least one solvent for the two prepolymers. An examples of commercially available primers that may be employed in accordance with the present teaching include, without limitation, Betaprime™ 5500.

Without intending to be bound by theory, it is believed that the compositions herein make advantageous employment of a particular molecular structure by which at least a portion of the molecule includes silicon (e.g., it is silanated), and a portion of the molecule includes a functionality, such as an isocyanate functionality, which is capable of linking with a base primer such as through the molecular network of the base primer and of the combination of an aliphatic isocyanate prepolymer with an aromatic isocyanate prepolymer. Such prepolymers may be part of a base primer composition.

The isocyanates useful herein may be selected from diisocyanates, tri-isocyanates or any combination thereof. Suitable isocyanates may include an aliphatic, cycloaliphatic, araliphatic, heterocyclic, aromatic isocyanate, or any combination thereof. Particular examples may include an isocyanate selected from hexamethylene diisocyanate (HDI), isophorone diisocyanate (IPDI), methylene diphenyl 4,4'-diisocyanate (MDI) or any combination thereof, and still more particularly one selected from isophorone diisocyanate (IPDI), methylene diphenyl 4,4'-diisocyanate (MDI), toluene diisocyanate (TDI), or any combination thereof. As noted, polymeric derivatives of any of the isocyanates herein are also contemplated.

Preferably the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionality may also be used, but may cause excessive cross-linking, and result in an adhesive which is too viscous to handle and apply easily, and can cause the cured primer to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200.

Exemplary isocyanate-reactive compounds may be an organic compound having at least two isocyanate-reactive moieties, such as a compound containing an active hydrogen moiety, or an iminofunctional compound. For the purposes of this invention, an "active hydrogen" containing moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids.

Suitable polyols may include, for example, polyether polyols, polyester polyols, poly(alkylene carbonate)polyols, hydroxyl-containing polythioethers, polymer polyols, and mixtures thereof. Polyether polyols may include, for example, one or more diols, triol or tetrols based upon polyoxyethylene, polyoxypropylene, polyoxybutylene, and/or polytetramethylene ether. In general, polyether polyols are prepared by polymerizing alkylene oxides in the presence of an active hydrogen-containing initiator compound. Most preferred, however, are alkylene-oxide-capped polyols.

Preferably, the isocyanate-reactive compound has a functionality of at least about 1.5, more preferably at least about 1.8, and is most preferably at least about 2.0; and is preferably no greater than about 4.0, more preferably no greater than about 3.5, and most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500. One particular example employs a polyol isocyanate reactive compound that has an equivalent weight of from about 100 to about 1500, and more specifically about 300 to about 1000.

The isocyanate and isocyanate reactive compound may be reacted in the presence of a suitable catalyst. Catalysts for use herein may include, for example, a metal complex such as a stannous or stannic compound. Examples include a stannous salt of a carboxylic acid (e.g., stannous octoate, stannous oleate, stannous acetate, and stannous laurate), a trialkyltin oxide, a dialkyltin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Other catalysts may also be used. For example, tertiary amine catalysts include trialkylamines (e.g., trimethylamine, triethylamine), heterocyclic amines, such as N-alkylmorpholines (e.g. N-methylmorpholine, N-ethylmorpholine, dimethyldiaminodiethyl ethel, etc.), 1,4-dimethylpiperazine, triethylenediamine, etc. Aliphatic polyamines, such as N,N,N',N'-tetramethyl-1,3-butanediamine may also be used as catalysts. One highly preferred catalyst includes a dibutyltin compound, and more specifically, it includes or consists essentially of dibutyltin dilaurate. In one particular embodiment, however, the catalyst employed will be one or more catalyst selected from metal salts such as tin carboxylates, organo silicon titanates, alkyl titanates, bismuth carboxylates, or an ether such as dimorpholinodiethyl ether (DMDEE) or alkyl-substituted dimorpholinodiethyl ethers. Among preferred catalysts are, dimorpholinodiethyl ether and (di-(2-(3,5-dimethylmorpholino) ethyl)) ether. Such catalysts, when employed (alone or in combination) are preferably employed in an amount up to about 1% by weight of the overall composition, more specifically less than about 0.8% by weight of the overall composition (e.g., about 0.1 to about 0.8%, and more particularly about 0.3 to about 0.5%). In one aspect of the invention, the catalyst employed will be devoid of any bismuth.

The isocyanate and isocyanate reactive compound may be reacted also in the presence of a suitable silane (e.g., an aminosilane) for introducing silicon into the base primer.

The resulting compositions herein may include one or more other ingredients, such as a solvent, a stabilizer, a film former, a colorant or pigment (e.g., carbon black, e.g., Raven 420), a filler, an ultraviolet protectant, or any combination thereof.

The solvent component of the primer composition is-volatile and is preferably a solvent that will dissolve the resin at a temperature in the range of from about −10° C. to about 100° C., more preferably from about 0° C. to about 40° C. The solvent is preferably anhydrous in order to help prevent the isocyanate groups from prematurely reacting with water. Examples of such solvents include xylene, ethylbenzene, toluene, ethyl acetate, propyl acetate, butyl acetate, butanol, propanol, isopropanol, ethanol, acetone, -methyl ethyl ketone, butoxyl, 2-butoxyethanol, 3-methoxybutylacetate, NMP, n-heptane, petroleum, or any combination thereof, and is preferably butoxyl, methyl ethyl ketone, ethyl acetate or a mixture thereof. The solvent will comprise the balance any of the resulting or intermediate compositions and is preferably used in an amount of at least about 40 percent, more preferably at least about 50 percent, and most preferably at least about 60 percent; and is preferably no greater than about 90 percent, more preferably no greater than about 85 percent, and most preferably no greater than about 80 percent, based on the weight of the total primer composition.

In one embodiment, it is further contemplated that a (meth) acrylic film forming resin may be employed. Suitable film-forming resins include polyacrylate resins, epoxy resins, polyester resins (polymers of a carboxylic acid and a glycol), polyester copolymers, polyvinyl chloride resins, chlorinated rubber, ethylene vinyl acetate copolymers, polyacrylate copolymers, or any combination thereof. The film forming resin is preferably soluble in any solvent used in the composition. In one preferred embodiment, the film forming resin preferably has a molecular weight of greater than about 3,000 and more preferably greater than about 5,000. The film forming resin preferably has a molecular weight less than about 50,000 and more preferably less than about 30,000. One specific film forming resin is a poly(meth)acrylate resin. An example of one particular preferred film forming resin is an acrylic copolymer with a hydroxyl equivalent weight of about 2,000, commercially available in solution from Rohm and Haas Company as Paraloid™ B48N. The film-forming resin may be present in any suitable amount. For example, it may be present in an amount of about 0.1 parts by weight, about 1 part by weight, or even about 5 parts by weight, or greater, based on the weight of the primer composition. If employed, the concentration of the film forming resin is preferably less than about 10 parts by weight of the overall composition, and more preferably less than about 5 parts by weight of the overall composition, and still more preferably less than about 2 parts by weight (e.g., up to about 0.5 parts by weight) of the overall composition.

Fillers commonly used in polymers and polyurethane primers may be used in the compositions of this invention. Suitable fillers may be selected from titanium dioxide, calcium carbonate, surface treated silica, mica, fumed silica, talc or any combination thereof. If employed, the concentration of the filler is generally less than about 40% by weight of the overall composition, and more specifically is from about 5 to about 20% by weight of the overall composition, e.g. about 7 to about 15% by weight of the overall composition.

Other ingredients may also be employed, such as (without limitation), a catalyst, an initiator, a curing agent, a light stabilizer, a flame retardant, a plasticizer, a thixotrope, or any combination thereof. Illustrations of additives are found, without limitation, in U.S. Pat. No. 6,133,398 (incorporated by reference).

One particular preferred composition includes the base primer composition, and the ingredient including an oxazolidine ring or derivative or analog thereof, and further may specifically include a stabilizer (e.g., diethylmalonate), an acid (e.g., phosphoric acid), or both.

By way of illustration, the concentrations of the primer composition ingredients herein are further described. For example, the base primer may be present in an amount of about 20 to about 90 percent by weight and more specifically about 30 to about 60 percent by weight (e.g., about 40 to about 45 percent by weight). The first adduct, if present, will be present in an amount up to about 20 percent by weight, and more specifically up to about 10 percent by weight (e.g., about 2 to about 4 percent by weight). The second adduct, if present, will be present in an amount up to about 20 percent by weight, and more specifically about 2 to about 10 percent by weight (e.g., about 4 to about 6 percent by weight). The isocyanate functional prepolymer with an isocyanate content greater than about 1%, if present, will be present in an amount of up to about 50 percent by weight, and more specifically about 5 to about 30 percent by weight (e.g., about 15 to about 20 percent by weight). One specific composition may also include a catalyst (e.g., DMDEE) in an amount up to about 0.8 percent by weight, more specifically about 0.1 to about 0.5 percent by weight, and still more specifically about 0.13 to about 0.3 percent by weight. For an application in which a pigment or colorant (e.g., carbon black) is employed, it may be employed in an amount of up to about 40 percent by weight, more specifically about 5 to about 20 percent by weight, and still more preferably about 7 to about 15 percent by weight. The composition may also include about 0.1 to about 0.5 percent by weight diethylmalonate (e.g., about 0.25%) and about 0.01 to about 0.05 percent by weight phosphoric acid (e.g., about 0.03 percent by weight).

The skilled artisan will be familiar with how to prepare the ingredients herein. See generally, U.S. Pat. No. 6,133,398 (incorporated by reference). In general, the compositions and their respective reaction product ingredients may be prepared by any suitable method, such as bulk polymerization and solution polymerization. The reaction steps, and also preferably the step or steps of mixing of all components with one or more of the ingredients herein are carried out under anhydrous conditions, preferably under an inert atmosphere such as a nitrogen blanket, to help prevent crosslinking of the isocyanate groups by atmospheric moisture.

The primer compositions herein may be employed in any of a number of applications. One particular approach is to apply the primer composition (e.g., as a one part composition), using art-disclosed techniques, to a substrate for use in an automotive vehicle windshield, backlight, side window, sun/moon roof, architectural window, skylight, porthole, door opening, display case, a lens or otherwise. Another useful application is for printing If labels, packages, containers (e.g., beverage bottles), or otherwise. A preferred application is the use of the primer compositions herein to make substantially transparent panel assemblies. The assemblies herein may be adapted for temporary or permanent mounting to a structure. The assemblies may be adapted for opening, closing, or otherwise translating, e.g., by sliding, by articulating, by pivoting, by folding, or any combination thereof. The assemblies thus may be employed in one or more applications such as automotive vehicle backlights, side windows, sun/moon roofs, architectural windows, skylights, portholes, door openings, display cases, or otherwise. The compositions and methods herein are also particularly useful when employed in combination with pre-applied adhesive systems.

Typically, the substrates will be substantially flat or shaped, e.g., for defining a curved surface. The substrates will generally be panels that are transparent through at least one surface, and particularly through both opposing surfaces, over at least about 25% of the area of the surface, and more specifically, at least a majority (e.g., at least about 60%, 75% or even 90% of the area of the surface). The substrates herein generally will be made from a substantially amorphous material, and particularly an amorphous ceramic (such as glass), a plastic, or a combination thereof. Without limitation, examples of suitable substrate materials include poly(meth)acrylates, polycarbonates, vinyls (e.g., polyvinyl chlorides), polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Substrates may have a laminated layer, a tint or any combination thereof. Substrates may also be a reaction injection molded plastic. Assemblies that include reaction injection molded parts encapsulating a panel, such as a substantially transparent panel, may be bonded according to the teachings herein. An example of one possible approach to the manufacture of encapsulated panels is disclosed in U.S. Patent Application Ser. No. 60/870,643 (entitled: "ENCAPSULATED PANEL ASSEMBLIES AND METHODS FOR MAKING SAME"; incorporated by reference). The compositions herein may also be employed for bonding a surface of a pinchweld assembly.

Though some applications may call for the coating of substantially an entire surface of a substrate with the coating composition herein, ordinarily the coating compositions will be applied to the substrates selectively, according to a predetermined pattern (e.g., substantially along an edge portion of the substrate, about the periphery of the substrate, or otherwise). For example, one approach is to apply the coating from the edge of the substrate inwards toward the central portion in a width of about 2, 5, 8, or even 12 cm or greater. It is also possible that the coating composition will may be applied for defining one or more lines, curves, dots, or other geometric configurations comprising segments of constant or varying width height, length or other dimension.

Any of a variety of art-disclosed patterns may be applied. The primer composition may be applied to a substrate (e.g., glass or coated plastic) using any art-disclosed means, such as using a brush, roller, sprayed onto the surface, ink jet printing, screen printing and the like. It may be applied using art-disclosed robotic application devices (e.g., one having at least 2 axes of motion). After application of the primer composition to the surface of the substrate, it is exposed to polymerization conditions.

The substrates herein typically will include at least one surface onto which the composition is applied. The surface may optionally be treated for improving the bond strength of the coating to the substrate, e.g. by a primer, a flame spray, a corona treatment, a plasma treatment, or some other surface treatment. However, in one specific example, the outer surface is substantially free of any surface treatment. Accordingly, upon application, the coating composition is in direct intimate contact with the substrate, and particularly in the substantial absence any intermediate interface layer. Of course, after applying the composition to the substrate it is also possible to apply over some or all of one or both of the composition and substrate a further layer (e.g., a silicone, an acrylic, a polyurethane, or otherwise, for realizing a protective over-layer). It is also possible that the coating composition herein may be employed over, beneath and/or adjacent an inorganic or an organic frit (e.g., a frit of the type taught in co-pending application Ser. No. 11/472,119 filed Jun. 20, 2006 (priority to 60/692,318 filed Jun. 20, 2005)), by Baikerikar et al. (incorporated by reference).

When applied, the compositions herein generally will have a thickness of up to about 250 microns or higher. More commonly it will be less than about 150 microns, less than about 100 microns or even less than about 50 microns (e.g., about 10 to about 30 microns or smaller).

Examples of suitable adhesives or sealants for use in combination with the primer compositions of the present invention include, without limitation, one-part or two-part urethane compositions, which in turn may be moisture curable. Particularly preferred urethanes are based upon MDI, HMDI, or a combination thereof. Examples of commercially available adhesives include, without limitation, those available from The Dow Chemical Company under the designation BETASEAL™, such as one or more of grade Nos. 1759, 1841, 1843, 1965, 2002, or 2002 LVRP. Other suitable commercial examples include, without limitation, those available from The Dow Chemical Company under the designation BETASEAL™ (e.g., Grade Nos. 15-625, 15-685, 15-845 or the like).

The invention also contemplates kits that include an adhesive or sealant composition and one or more primer compositions. For example, such a kit might include one or more primer compositions in accordance with the present invention, with or without the adhesive or sealant composition (e.g., a one-part urethane or a two-part urethane adhesive). It may also include one or more cleaners, applicators, tapes, tools or any combination thereof. The compositions herein may be provided in a cartridge, a foil pack or both.

The compositions herein provide a generally hard and abrasion resistant coating. It is also expected that the compositions will exhibit excellent adhesion performance and weatherability. The resulting primer materials freshly prepared according to the teachings herein also is expected to have good storage stability.

Compositions herein are useful in priming a substrate to which an adhesive or other sealant is thereafter applied. Accordingly, one aspect contemplates contacting a substrate with the compositions described herein. More specifically, the compositions herein are useful in methods for securing a glass panel to a structure of a vehicle, such as an automotive vehicle, which includes the steps of (a) applying (e.g., by using any suitable art-disclosed method, such as swabbing, brushing, spraying, dipping, wiping, or otherwise) the primer composition of the invention substantially along the periphery of one side of the glass panel (e.g., window); (b) superimposing on the primer composition a bead of an adhesive and (c) installing the glass panel by contacting the sealant (e.g., adhesive) with a vehicle structure defining an opening into which the glass panel is to be placed and allowing the adhesive and primer composition to cure. The primer herein is intended to be applied onto or otherwise contacted with a substrate and later covered with a sealant (e.g., an adhesive). Substrates that may be employed include non-porous substrates, such as glass (e.g., plate glass, glass frit, coated glass, tinted glass, reflective glass, tempered glass, annealed glass, or any combination thereof). Any of a number of other substrates may be employed, such as enamel, cured polyurethane, glass encapsulation materials, e-coat, galvanic zinc coats, aluminum, steels, paint, plastics, hard coated organic glazing or any combination thereof. The composition may be applied to the substrate using any suitable method. Prior to applying the composition to the substrate, the substrate, may undergo a step or steps to clean, dry or otherwise prepare the surface for the primer. Any of a number of adhesives or other sealants may be employed.

The present invention permits the above steps (a) and (b) to be separated by a period of longer than 20 seconds and up to about 1 year (e.g., up to about 3 or even 6 months) at room temperature. More specifically, one method of the present invention contemplates a step of performing the step (b) at least one minute, one hour, one day one week or even one month after step (a) is performed. The step (b) may also be performed within from one minute to three months of step (a), or from one hour to one month of step (a). The lapse of time between the steps (a) and (b) does not appreciably impact the resulting adhesion characteristics of the primer of the invention, with resulting bonds still being capable of withstanding at least 500, 1000, or even 2000 hours of accelerated weathering under a natural sunlight simulator (e.g., a Xenon arc light source, such as by use of weatherometer testing ("WOM") according to SAE J1885, ASTM D2565-99, SAE J1960 or another suitable standard). For such weatherometer testing, one approach is to provide glass substrates having a black enamel on one side. The primer herein is applied to the enamel, and a sealant applied over the primer. The substrates are then bonded together and aged (e.g., for 7 days) for curing of the sealant.

It will further be appreciated that a plurality functional ingredients or steps may be combined into a single ingredient or step, or the functions or structures of one step or ingredient may be split among plural steps or ingredients. For example, it should be appreciated that the above contemplates the employment of a plurality of individual prepolymers or other ingredients. The ingredients may be combined simultaneously, in sequence or a combination thereof. Thus, combinations of two or more of the prepolymers or other ingredients may be employed, such as by combining the reaction products of two or more of the ingredients after the reaction giving rise to the reaction product has occurred, or by employing a single ingredient that employs the functional features of multiple described ingredients. Alternatively, functions performed by one of the ingredients might be split among or performed by other ingredients. The present invention contemplates all of these combinations. Unless stated otherwise, concentrations and amounts of the various features depicted herein are not intended to be restrictive of the invention, and others are possible. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Percentages expressed herein are not intended to be limiting. The amounts recited can be converted to proportionate amounts of some or all of the ingredients, and such amounts are contemplated as well. For example, if a composition recites 10% by weight of A, 40% by weight of B and 50% by weight of C, the skilled artisan will recognize that it is contemplated that A and B will be present in a 1:4 part ratio (e.g., 1 part A and 4 parts B). Alternatively, B and C are present in a 4:5 ratio (e.g., 4 parts B and 5 parts C).

The following illustrations, which are not intended to be limiting, demonstrate the compositions of the present invention and certain preferred embodiments thereof. The values shown are approximate and should not be regarded as limiting of the invention. Variations in the processing parameters are possible. In addition, the expected results shown may vary as well (e.g., by about +/−10% of the stated values). For these illustrations, various polyurethane sealants, commercially available as BETASEAL™ grades from The Dow Chemical Company are tested. The grades BETASEAL™ 1759, 1841, NC-1 and 1843 are referred to in the Tables 1 as Sealant 1, 2, 3 and 4, respectively. In general, for the cataplasma cycling, the samples are placed directly in a climatic chamber at 70° C., 100% relative humidity, for 7 days, or wrapped in cotton wool, humidified with enough water and sealed in a polyethylene bag to be stored afterwards in an oven at 70° C. for 7 days. Next, the samples are placed in a freezer for 16 hours at −20° C., after which the sample is allowed to stand at room temperature for 2 hours. The cycle may be repeated multiple times, after which the samples are removed from the bag and subjected to the quick knife adhesion test. Desirably, there is no blistering and failure is cohesive in the sealant layer. For the test results, presented in the following tables only 1 cataplasma cycle is applied.

A primer, referred to as Primer C is prepared by admixing an example of a base primer, the oxazolidine compound and the adduct and other components in the following proportions (in parts by weight):

| | |
|---|---|
| Oxazolidine | 500 parts |
| Betaprime ™ 5500 | 6100 parts |
| First Adduct | 310 parts |
| Second Adduct | 500 parts |
| Phosphoric Acid | 1 part |
| Carbon Black | 750 parts |
| Film Forming Resin | 40 parts |
| MEK Solvent | 1799 parts |
| | 10,000 parts |

The primer (C) of the above Example is applied to a substrate coated with a conventional enamel (of a type commonly employed in the manufacture of automotive vehicles in the United States), after the enamel coated substrate is cleaned with Dow Betaclean™ BC 3300 cleaner. Dow Sealant Betaseal™ 1759 is applied just after 3 minutes of application of the primer. The assembly is subjected to Weather-O-meter aging according to SAE J 1960 by UV radiation exposure for 2000 hours in a Ci65 instrument by Atlas. Upon subjecting to a peel test (quick knife test) according to the description below the resulting bond of the primer to sealant fails entirely in the cohesive mode.

The primer (C) of the above Example exhibits excellent storage stability, as demonstrated by only slight viscosity increases over time. For example, measuring viscosity (4 mm cup according to DIN 53211) results in the following approximate values.

| Viscosity: Din 53211 Cup (4 mm) | Fresh | 1 Month (40° C.) | 2 Months (40° C.) | 3 Months (40° C.) |
|---|---|---|---|---|
| (s) | 11.8 | 12.7 | 13.9 | 15.8 |

For the data in the following Tables, a peel test (quick knife test) is employed. The cured and aged bead (height of about 4 to 6 cm, and length of about 100 to 150 cm) is peeled back from the substrate, at an angle of about 90°, for a minimum of 3 cm. Any residual bead is cut through to the substrate, at an angle of 90° to the direction of the bead, at intervals of approximately 1 cm along the length. Using the Code Table of Appendix 1, the failure mode observed after peeling, at the fracture- or delamination-surface, is evaluated and classified. Any area with cohesive failure is estimated, as the percentage of the area tested, and rated with a number from 1 to 5. Then the remaining area is evaluated, against the failure modes listed in the Code Table of Appendix 1, and is designated with the relevant code letters. The results are recorded using the following format: Number letter letter letter, with the number indicating the % area of cohesive failure, and the letters, in descending order, indicating other failure modes observed. For example, a reporting of 2abv means 25% cohesive failure, the remainder being delamination which is more of type "a" than "b" and more "b" than "v"; 2a/b would mean 25% cohesive failure, with the rest being equal proportions of "a" and "b".

The substrate is float glass and the primer is applied by using a standard spray application unit. The open times refer to the time elapsed between application to the substrate and the subsequent application of sealant. Unless otherwise stated, the open time (specified for example as seconds (s), minutes (min), days (d), or month (mt)) conditions are at a temperature of 32° C., and 80% relative humidity ("RH") ("32/80"). The aging protocol for the assembly is also specified, with 7dRT meaning 7 days at room temperature; +7dH2O meaning 7 additional days immersed in water (e.g., demineralised water (23° C.)); +7d90° C. meaning 7 days at room temperature, followed by 7 days immersed in water (e.g., demineralised water (23° C.)), followed by 7 days at 90° C. (in an air-circulated oven); +7dCata meaning 7 days at room temperature followed by 7 additional days immersed in water (e.g., demineralised water (23° C.)), followed by 7 days at 90° C. (in an air-circulated oven), and a 7 day cataplasma treatment. A suitable climatic chamber may be used for deriving the appropriate test conditions.

In Table 2, expected data is reported for BETAPRIME™ 5500, which is believed to be a representative one step primer composition of the prior art applied to float glass. It is seen that improved results using the primers herein are expected as compared with prior art one component primers.

In Table 3, it is shown how variation of any coating or frit on the glass is not believed to materially impact the results using the compositions herein.

TABLE 1

Testing after different open times of the primer C on float glass

| Primer C | Open Time | Sealant | 7 d RT | +7 d H2O | +7 d 90° C. | +7 d Cata |
|---|---|---|---|---|---|---|
| | 20 s | 1 | 5 | 5 | 5 | 5 |
| | 20 s | 2 | 5 | 5 | 5 | 5 |
| | 20 s | 3 | 5 | 5 | 5 | 5 |
| | 20 s | 4 | 5 | 5 | 5 | 5 |
| | 3 Min | 1 | 5 | 5 | 2-3b | 3-4b |
| | 3 Min | 2 | 5 | 5 | 5 | 5 |
| | 3 Min | 3 | 5 | 5 | 5 | 5 |
| | 3 Min | 4 | 5 | 5 | 5 | 5 |
| | 7 d 32/80 | 1 | 5 | 5 | 5 | 5 |
| | 7 d 32/80 | 2 | 5 | 5 | 5 | 5 |
| | 7 d 32/80 | 3 | 5 | 5 | 5 | 5 |
| | 7 d 32/80 | 4 | 5 | 5 | 5 | 5 |
| | 1 Mt RT | 1 | 5 | −5a | 5 | 5 |
| | 1 Mt RT | 2 | 5 | −5ai | 5 | 5 |
| | 1 Mt RT | 3 | 5 | 5 | 5 | 5 |
| | 1 Mt RT | 4 | 5 | 5 | 5 | 5 |
| | 1 Mt 32/80 | 1 | 5 | 5 | 5 | 5 |
| | 1 Mt 32/80 | 2 | 4bi | 4i | 4i | 5 |
| | 1 Mt 32/80 | 3 | 5 | 5 | 5 | 5 |

TABLE 1-continued

Testing after different open times of the primer C on float glass

| Primer C | Open Time | Sealant | 7 d RT | +7 d H2O | +7 d 90° C. | +7 d Cata |
|---|---|---|---|---|---|---|
| | 1 Mt 32/80 | 4 | 5 | 5 | 5 | 5 |
| | 3 Mt 32/80 | 1 | 5 | 5 | 5 | 5 |
| | 3 Mt 32/80 | 2 | 4i | 5 | −5i | 5 |
| | 3 Mt 32/80 | 3 | 5 | 5 | 5 | 5 |
| | 3 Mt 32/80 | 4 | 5 | 5 | 5 | 5 |

TABLE 2

| Sealant | 3 d RT | 7 d RT | +7 d H2O | +7 d 90° C. | +7Cata |
|---|---|---|---|---|---|
| A: Comparative example: BP 5500 (open time 1 month at 23° C., 50% RH) | | | | | |
| BS 1759 | 4-5z | 4-5z | 4z | 2-3b | 1-2b |
| BS 1842 | 4-5z | 4-5z | 4z | 2-3b | 1-2b |
| BS 1841 | 4z | 4z | 4z | 2-3b | 1-2b |
| BS 1801 | 2b | 2b | 1b | 1b | 1b |
| BS NC1 | 5 | 5 | 5 | 5 | 5 |
| BS 1845 | 5 | 5 | 5 | 5 | 5 |
| B: Comparative example: BP 5500 (open time 2 weeks at 32° C., 80% RH) | | | | | |
| BS 1759 | 2-3b | 2-3b | 2b | 2b | 1b |
| BS 1842 | 2-3b | 2-3b | 2b | 2b | 1b |
| BS 1841 | 2-3b | 2-3b | 2b | 2b | 1b |
| BS 1801 | 1b | 1b | 1b | 1b | 1b |
| BS NC1 | 5 | 5 | 5 | 5 | 5 |
| BS 1845 | 5 | 5 | 5 | 5 | 5 |

TABLE 3

Adhesion Tests of Primer C on Different Ceramic Frits

| Cleaner | BC 3300 | | | | |
|---|---|---|---|---|---|
| Primer Open time | Sealant | 7 d RT | +7 d H2O | +7 d 90° C. | +7 d Cata |
| 3 min | BS 1759 | 5 | 5 | 5 | −5a |
| Primer Open time | Sealant | 7d RT | +7 d H2O | +7 d 90° C. | +7 d Cata |
| 3 min Enamel 24-8337 | BS 15625 | 5 | 5 | 5 | 5 |
| Cleaner | BC 3300 | | | | |
| Primer Open time | Sealant | 7 d RT | +7 d H2O | +7 d 90° C. | +7 d Cata |
| 3 min | BS 1759 | 5 | 5 | 5 | 5 |
| Primer Open time | Sealant | 7 d RT | +7 d H2O | +7 d 90° C. | +7 d Cata |
| 3 min | BS 15625 | 5 | 5 | 5 | 5 |

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. References to an acrylic or (meth)acrylic (or derivative terms such as "acrylate") contemplate meth-acrylics and acrylics (and corresponding derivative terms). Unless otherwise stated, references to "adhesive" or "sealant" are interchangeable. Thus, mention of an adhesive of a particular composition also encompasses a sealant of such composition.

Though disclosed herein generally in the context of use in a one step primer composition, the second adduct, also referred to as an adhesion promoter herein are not so limited. They may also be employed as part of a primer system that includes multiple components, and may be added to any or all of the components. For example, the adhesion promoter might be incorporated into a urethane activator composition, a frit preparation composition, a frit primer composition, a PVC primer, a pinchweld primer, or otherwise, such as one or more products from The Dow Chemical Company that has been sold under the designation U-413, U-555, U-4000, U-401, U-402 or the like.

The teachings herein may be suitably employed in combination with one or both of co-pending application Ser. No. 60/913,703; (filed Apr. 24, 2007): "Universal Primer Compositions and Methods"); or co-pending application Ser. No. 60/913,706; (filed Apr. 24, 2007): "Improved Primer Adhesion Promoters, Compositions and Methods"), both incorporated by reference herein.

APPENDIX 1

1 0% cohesive failure
2 approx. 25% cohesive failure
3 approx. 50% cohesive failure
4 approx. 75% cohesive failure
5 approx. 100% cohesive failure
a Adhesive with or without primer exhibits delamination from the substrate.
b Adhesive exhibits delamination from the primer
c If cut to the substrate, some delamination at the incision
d Separation of layers in the primer system
e Adhesive/primer or adhesive/substrate interface tacky
f Primer dissolves the substrate surface
g Primer blisters or peels off the surface of adhesion next to the adhesive bead
h* Substrate delamination
k corrosion under bead
i Bubbles in the adhesive
m Migration of plasticizer from the adhesive to the substrate
n Migration of plasticizer from the substrate to the adhesive
r Bubbles in the coating under adhesive bead
s Bubbles in the coating next to adhesive bead
t Bubbles in the coating under primer and next to the adhesive bead
u Delamination in the coating system
v Coating delaminates from substrate
w If the coating of the substrate is cut, it slightly peels off with the adhesive
x Cohesive failure close to the adhesive/primer or adhesive/substrate interface
y Reinforcing fibres become detached from the substrate
z Delamination at the edge
L Crevices in the adhesive
T Tunnels in the adhesive
*=Evaluation always provided with a further number

The invention claimed is:

1. A one component long open time primer composition that comprises a base primer composition including (a) an isocyanate functional prepolymer derived from the reaction of an aliphatic polyisocyanate and a polyol, and which is partially reacted with an amino group of a secondary aminosilane, wherein the aminosilane includes two or three methoxy groups bound to silicon, two or three ethoxy groups bound to silicon, or a combination thereof; (b) an isocyanate functional prepolymer with an isocyanate content greater than about 1%, which is the reaction product of an aromatic polyisocyanate and a polyol of Mn>300; and (c) at least one solvent for the components (a) and (b); and an ingredient including an oxazolidine ring or derivative or analog thereof, wherein the primer exhibits an open time of at least about 1 month.

2. The composition of claim 1, wherein the ingredient including an oxazolidine ring, or derivative or analog thereof, includes a bisoxazolidine and is present in an amount of about 2 to about 8% by weight of the overall composition.

3. The composition of claim 2, wherein the first adduct is present in an amount ranging up to about 20% by weight of the overall composition.

4. The composition of claim 3, wherein the second adduct will generally be present in an amount ranging from about 0 to about 20% by weight of the overall composition.

5. The composition of claim 1, further comprising a (meth)acrylic film former in an amount less than about 10% by weight of the overall composition, a filler, diethylmalonate, an acid, an additional solvent, a catalyst, a colorant or pigment or any combination thereof.

6. The composition of claim 5, wherein the colorant or pigment includes carbon black, the acid is phosphoric acid, or both.

7. A composition according to claim 1 wherein the polyols for the (a) isocyanate functional prepolymer derived from the reaction of an aliphatic polyisocyanate and a polyol, and for the (b) isocyanate functional prepolymer with an isocyanate content greater than about 1%, which is the reaction product of an aromatic polyisocyanate and a polyol of Mn>300 are polyether polyols.

8. The composition of claim 1, further comprising a first adduct of (i) an aliphatic isocyanate and (ii) a mercaptosilane, an amino-silane, or both.

9. The composition of claim 8, further comprising a second adduct of (i) an aromatic polyisocyanate and (ii) a mercaptosilane, an amino-silane, or both.

10. The composition of claim 9, wherein the isocyanate functional prepolymer with an isocyanate content greater than about 1% is a reaction product of an aromatic diisocyanate and a polyethertriol.

11. The composition of claim 9, wherein the aromatic polyisocyanate includes a thiophosphate, a phosphate or a thiophosphane moiety.

12. The composition of claim 11, wherein the aromatic polyisocyanate is tris-(isocyanatophenyl)thiophosphate.

13. A composition according to claim 9 wherein the second adduct is the reaction product of about 1 mole of (i) an aromatic polyisocyanate and from about 1 to about 3 moles of (ii) a mercaptosilane, an aminosilane or both.

14. A composition according to claim 9 wherein the second adduct is the reaction product of about 1 mole of (i) an aromatic polyisocyanate and from about 2.3 to about 3 moles of (ii) a mercaptosilane, an aminosilane or both.

15. A composition according to claim 9 wherein the first adduct is the reaction product of (i) a trifunctional aliphatic polyisocyanate and (ii) a mercaptosilane, an aminosilane or both.

16. A composition according to claim 15 wherein the first adduct is the reaction product of (i) a trifunctional aliphatic polyisocyanate and (ii) a secondary aminosilane.

17. A composition according to claim 9 which comprises:
from about 20 to about 90 percent by weight of prepolymer (a) and (b);
up to about 20 percent by weight of the first adduct;
up to about 20 percent by weight of the second adduct;
from about 40 to about 90 percent by weight of at least one solvent for the components (a) and (b); and,
from about 1 to about 10 percent by weight of an ingredient including an oxazolidine ring or derivative or analog thereof.

18. A composition according to claim 17 which further comprises from about 0.1 to about 10 parts by weight of a (meth)acrylic acid film forming resin.

19. A composition according to claim 18 wherein the first adduct is present in an amount of from about 1 to about 10 percent by weight of and the second adduct is present in an amount of up to about 10 percent by weight.

20. A one component long open time primer composition that comprises a base primer composition including (a) an isocyanate functional prepolymer derived from the reaction of an aliphatic polyisocyanate and a polyol, and which is partially reacted with an amino group of a secondary aminosilane, wherein the aminosilane includes two or three methoxy groups bound to silicon, two or three ethoxy groups bound to silicon, or a combination thereof; (b) an isocyanate functional prepolymer with an isocyanate content greater than about 1%, which is the reaction product of an aromatic polyisocyanate and a polyol of Mn>300; and (c) at least one solvent for the components (a) and (b); and an ingredient including an oxazolidine ring, or derivative or analog thereof, which includes a carbamic acid, 1,6-hexanediyl bis-, bis(2-(2-(1-methylethyl)-3-oxazolidinyl)ethyl)ester, and is present in an amount of about 4 to about 6% by weight of the overall composition.

21. A bonded structure comprising a transparent substrate, a vehicle structure, an adhesive, and long open time primer composition that includes a base primer composition having (a) an isocyanate functional prepolymer derived from the reaction of an aliphatic polyisocyanate and a polyol, and which is partially reacted with an amino group of a secondary aminosilane, wherein the aminosilane includes two or three methoxy groups bound to silicon, two or three ethoxy groups bound to silicon, or a combination thereof; (b) an isocyanate functional prepolymer with an isocyanate content greater than about 1%, which is the reaction product of an aromatic polyisocyanate and a polyol of Mn>300; and (c) at least one solvent for the components (a) and (b); and an ingredient including an oxazolidine ring or derivative or analog thereof, wherein the primer exhibits an open time of at least about 1 month, and wherein the primer is applied to at least a portion of the substrate for receiving the adhesive for contact with the vehicle structure.

* * * * *